Aug. 20, 1935. T. R. WATTS 2,011,665
ELECTRICAL MEASURING APPARATUS
Filed May 3, 1933 2 Sheets-Sheet 2
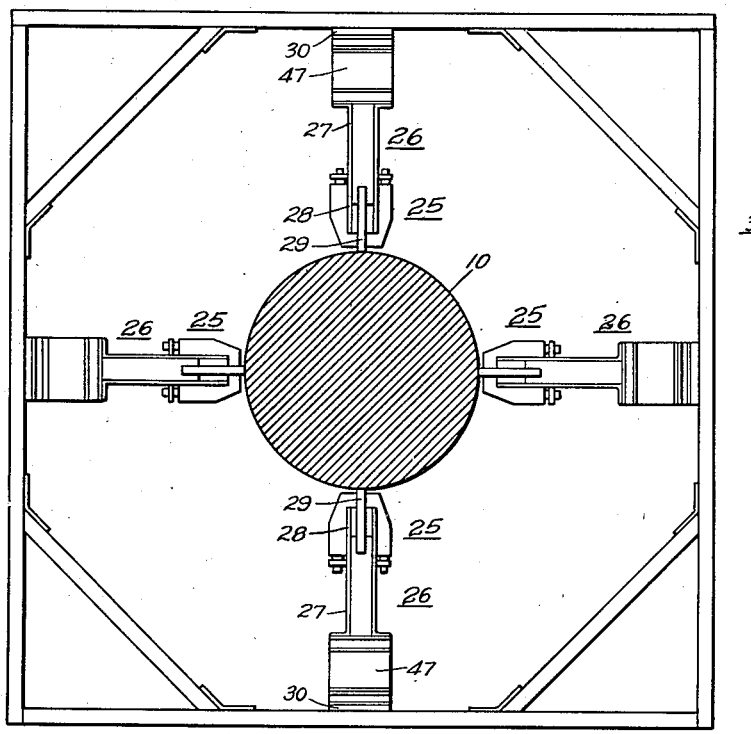
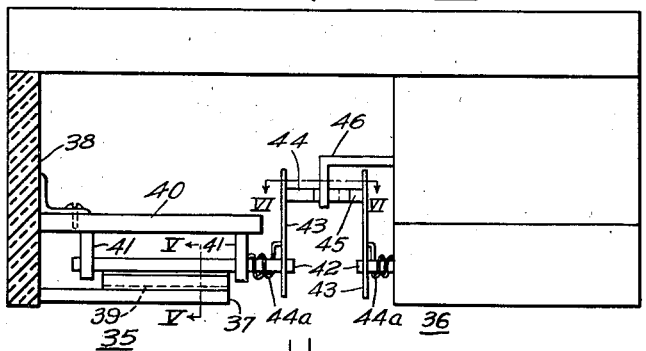
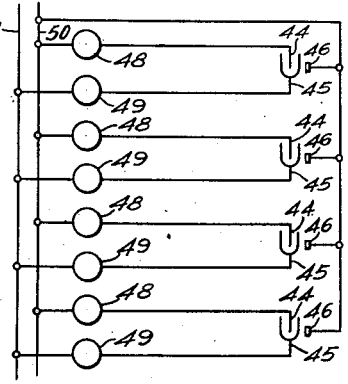
WITNESSES:
INVENTOR
Thomas R. Watts.
BY
ATTORNEY Patented Aug. 20, 1935

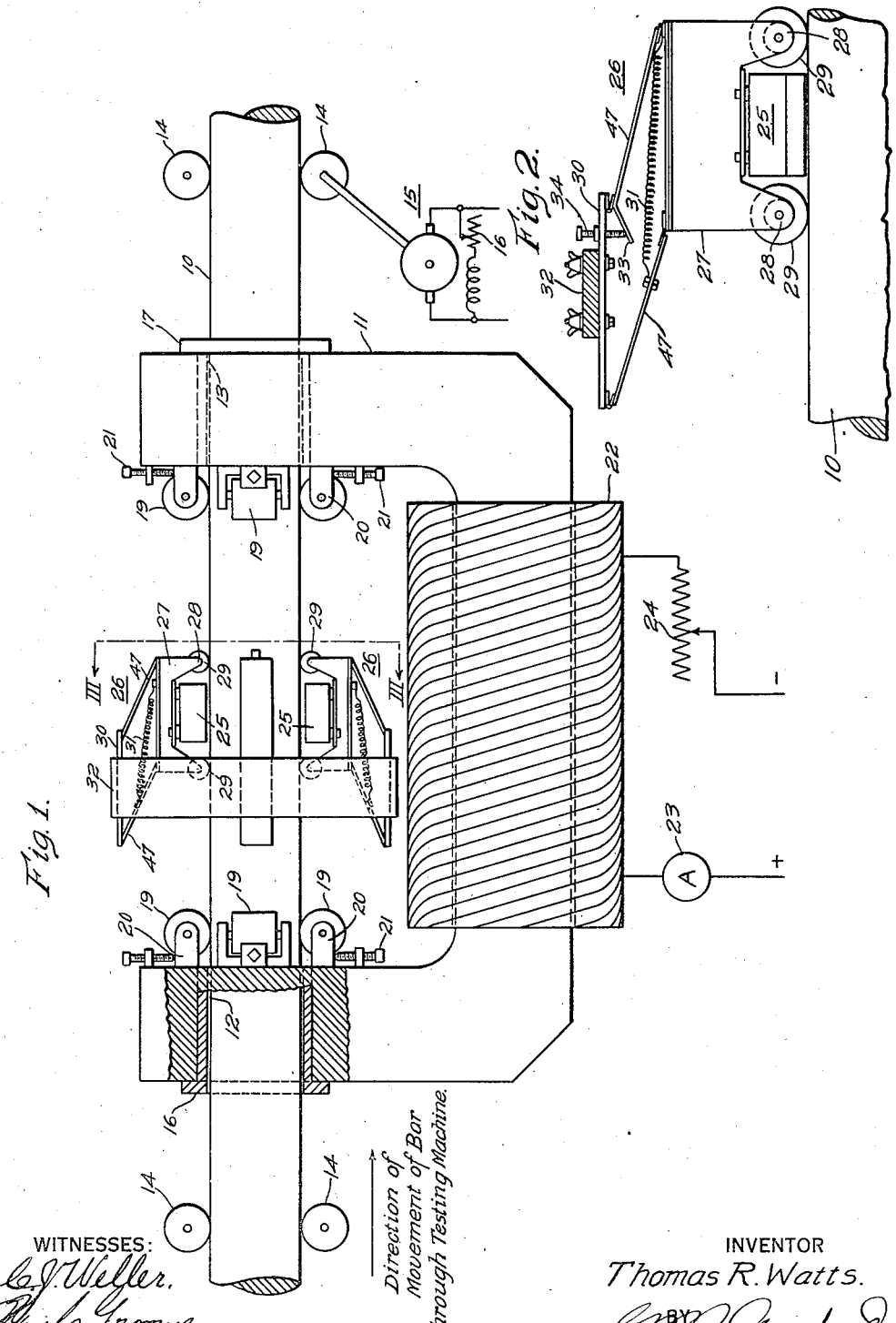

2,011,665

UNITED STATES PATENT OFFICE 2,011,665

ELECTRICAL MEASURING APPARATUS

Thomas R. Watts, Forest Hills, Pa., assignor to Westinghouse Electric & Manufacturing Company, East Pittsburgh, Pa., a corporation of Pennsylvania Application May 3, 1933, Serial No. 669,170

16 Claims. (Cl. 175—183)

My invention relates, generally, to electrical measuring apparatus and it relates particularly to apparatus for obtaining magnetic measurements.

The object of my invention, generally stated, is the provision of magnetic testing apparatus for detecting flaws in magnetic material which shall be simple, efficient and accurate in operation and which may be readily and economically manufactured, installed and operated.

The principal object of my invention is to provide for detecting the non-homogeneous character of magnetic material.

Another object of my invention is to provide for detecting the non-homogeneous character of magnetic material while the material itself is being moved relative to the detecting apparatus.

A further object of my invention is to provide for signalling to an operator the presence or existence of a slight flaw in magnetic material being tested.

Still another object of my invention is to provide additional signalling means for indicating to an operator the presence or existence of a relatively large flaw in magnetic material being tested.

Another object of my invention is to provide for testing bars of magnetic material of varying size with the same testing apparatus.

Other objects of my invention will in part be obvious and in part appear hereinafter.

My invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which Figure 1 is a view, in side elevation, of a particular embodiment of my invention, Fig. 2 is an enlarged view, illustrating in more detail the mounting of the measuring instruments used in practicing my invention, Fig. 3 is an enlarged sectional view taken along the line III—III of Fig. 1, Fig. 4 is an enlarged view of one of the measuring instruments, certain parts being broken away to more clearly illustrate the construction, Fig. 5 is an enlarged sectional view taken along the line V—V of Fig. 4, Fig. 6 is an enlarged sectional view taken along the line VI—VI of Fig. 4, and Fig. 7 is a diagrammatic representation of the signalling circuits which may be used in conjunction with the measuring instruments.

Referring now particularly to Fig. 1 of the drawings, the reference character 10 designates a bar of magnetic material such as rolled steel, the character of which it is desired to test in order to ascertain whether there are any serious flaws incorporated therein. It is particularly desirable to ascertain the character of bars of this type which may be used in the construction of such parts as axles for use in the construction of automobiles, railroad cars or the like without subjecting them to destructive tests or applying such tests as involve the use of expensive apparatus such as X-ray equipment. It will be readily understood that it is desirable to provide a simple and economical testing apparatus which will indicate the character of steel bars or the like with a considerable degree of rapidity, so that the cost of testing material of this type may be reduced to a minimum.

In order to obtain an indication of the homogeneity of the bar 10, an armature 11 is provided which, as illustrated, is of substantially U-shape. The ends of the armature 11 are provided with transverse aligned openings 12 and 13 through which the bar 10 may be driven by means of rollers 14 one or more of which may be driven by means of a motor 15. The motor 15 may be of any suitable type, such as a shunt wound direct current motor, as illustrated, and may be provided with a rheostat 16 for varying the speed thereof, as will be readily understood. As shown, the rollers 14 are disposed to cooperate in such manner as to guide the bar 10 through the openings 12 and 13 in the armature 11.

In order to provide for the testing of bars of different diameters, the openings 12 and 13 are formed large enough to accommodate the largest diameter of a bar which it is desired to test. When it is desired to test a bar of smaller diameter, removable collars 16 and 17, of magnetic material, may be positioned in the openings 12 and 13, in order to reduce the air gap, between the armature 11 and the bar 10, to a minimum. It will be readily understood that the collars 16 and 17 may be of different thicknesses in order to accommodate bars of different diameters.

It is desirable to accurately center the bar 10 within the openings 12 and 13 in order to maintain a uniform air gap around the bar 10 in the openings 12 and 13. For this purpose rollers 19 are provided in suitable frames 20 which may be slidably mounted upon the armature 11, as illustrated, and adjusted by means of an adjusting screw 21 to center the bar 10, as desired.

With a view to generating magnetic flux, both within and along the bar 10, a magnetizing winding 22 is provided around the central portion of the armature 11, as illustrated. This winding may be supplied with direct current from any suitable source. An ammeter 23 is provided for measuring the amount of current that is supplied to the magnetizing winding 22 and a rheostat 24 is also provided for varying the amount of current supplied, as may be desired.

In the event that the bar 10 being tested is generally of homogeneous structure and no flaws such as cracks, pipes or the like are present therein, the distribution of the magnetic flux within the bar 10 and the leakage flux along it will be substantially uniform. However, if a flaw or crack is present in the bar 10, its presence will alter the character of the magnetic field in the vicinity of the flaw or crack and will tend to increase the density of the leakage flux in this vicinity. Therefore, if a sensitive flux measuring device is provided for giving an indication of the density of the leakage flux, as the bar 10 is moved through the armature 11, it will be possible to detect flaws which may be present.

While a simple instrument that will indicate variations in flux density may be used, theoretically, for determining the character of the bar 10 as it is moved, it has been found in practice that such apparatus is not entirely satisfactory because of the fact that the conditions external to the bar 10 may not be entirely uniform under all circumstances and that, under certain conditions, a simple magnetic measuring instrument might indicate the presence of a flaw when, in fact, no flaw existed. These variations may be due to variations in the density of the leakage flux near the ends of the bar 10 being tested as it enters or leaves the testing apparatus, to variations in the air gap between the armature and the bar 10, or due to other causes, and, as a result, variations in the density of the leakage flux may occur, although the bar 10 may be entirely free from flaws. Under certain conditions, these variations would indicate that a flaw was present and for this reason the bar being tested might be rejected because of this apparent indication although, in fact, the indication that a flaw was present was due to variations in the density of the leakage flux which were caused by conditions external to the bar 10.

Therefore, in view of the foregoing, it is highly desirable to provide a magnetic measuring instrument which will be sensitive only to variations in the homogeneous character of the bar 10 and which will not be responsive to variations which are caused by conditions external to the bar 10 itself. An instrument of this type is illustrated generally at 25 in Figs. 2 and 3 of the drawings and it may be mounted, as illustrated, on an articulated frame shown generally at 26. The articulated frame 26 comprises a support member 27 to which the instrument 25 may be secured by any suitable means and which is provided with downwardly extending arms 28 on which rollers 29 are mounted. The rollers 29 are arranged to engage the bar 10 being tested and to maintain the lower edge of the instrument 25 in close proximity to the bar 10 and only slightly spaced therefrom. The support member 27 may be carried by means of arms 47 which are hinged to the top of the support member 27 at the lower ends and are also hinged to the under side of a cross member 30. A tension spring 31 is provided for exerting a biasing force on the articulated frame 26 to maintain the rollers 29 in engagement with the bar 10.

The cross members 30 of the articulated frames 26 may be secured to a main frame, illustrated generally at 32. The main frame 32 may be mounted by any suitable means, not shown, between the ends of the armature 11 in such position as to subject the instruments 25 to the principal part of the leakage flux which surrounds the bar 10. While only four instruments 25 and their associated articulated frames 26 have been illustrated in the drawings as being mounted on the main frame 32, it will be readily apparent that any number may be used, as desired, depending upon the size of the bars being tested and the accuracy and speed which it is necessary to obtain in the testing operation.

It will be observed that the spring 31 serves to bias the frame 26 inwardly in a radial direction. It is desirable to limit this movement to a certain extent in order to facilitate the positioning of the bar 10 within the testing apparatus. For this reason, one of the arms 47 is provided with an extension member 33 with which an adjusting screw 34 is arranged to cooperate to limit the inward radial movement of the frame 26 to any desired position.

Referring now particularly to Figs. 4, 5 and 6 of the drawings, it will be observed that the instrument 25 is shown in greater detail. In this instance, the instrument 25 is illustrated as being comprised of two instruments 35 and 36 which may be of the repulsion vane type or any other suitable type.

The instrument 35 comprises a stationary vane 37, which is mounted on a suitable non-magnetic support member 38, and a movable vane 39 which is rotatably mounted on a support member 40, which may also be of non-magnetic material, by means of bearing members 41 and a shaft 42, as illustrated. The vanes 37 and 39 are preferably formed of non-residual magnetic steel. It will be understood that when vanes of this character are used, they will repel each other when subjected to a magnetic field for the reason that they are similarly magnetized. However, as soon as the magnetic field is removed, the vanes 37 and 39 will return to their normal position, because of their non-residual characteristics.

At one end of the shaft 42 an arm or pointer 43 is provided which is adapted to carry a single contact member 44. A coil spring 44a is provided, as illustrated, for biasing the shaft 42 and thereby the vane 39 to the non-magnetized position.

The instrument 36 is identical with the instrument 35 with the exception that it is arranged to deflect in the reverse direction. That is, in the instrument 36 the relative position of the vanes 37 and 39 is reversed so that the application of a magnetic field to both instruments causes the arms 43 to move in the same direction. However, the arm 43 of the instrument 36 is provided with a bifurcated contact member 45, the arms of which are disposed in the path of the contact member 44, as illustrated in Fig. 6.

In addition, a stationary contact member 46 may be mounted on the instrument 36 for a purpose which will be set forth hereinafter.

While it is possible to obtain an indication of the character of the bar 10 by observing the relative position of the contact member 44 between the arms of the contact member 45, it is preferable to provide a suitable signalling means so that an operator using the testing apparatus need only observe the signalling apparatus rather than the relative position of the contact members 44 and 45.

As is more clearly illustrated in Fig. 7 of the drawings, indicating lamps 48 and 49 may be provided individual to each of the sets of contact members 44 and 45, as illustrated. The indicating lamps 48 and 49 may be individually connected to conductors 50 and 51 which may be energized from any suitable source of current.

It will be apparent that the indicating lamps 48 and 49 may be arranged on any suitable mounting, such as a panel or the like, where they will be convenient to the view of the operator. Since the position of the indicating lights 48 and 49 may generally be determined by the physical conditions under which the testing of the bars 10 is performed, their relative mechanical position with respect to the testing apparatus is not shown.

In operation, suitable magnetizing current is supplied to the magnetizing winding 22, as desired, and the motor 15 is energized to move the bar 10 through the openings 12 and 13 in the armature 11. The energization of the winding 22 generates a magnetic flux in the bar 10 and a leakage flux along it, as described hereinbefore. Since the vanes 37 and 39 of the instruments 35 and 36 are positioned in the field of the leakage flux, it will be readily apparent that they will be repelled from each other and that the arms 43 operated by the movable vanes 39 will be moved to a position depending upon the density of the leakage flux to which they are subjected. However, if the density of the flux of the leakage field, as applied to both instruments 35 and 36 is the same, there will be substantially no relative movement between the contact members 44 and 45. They, however, will move to some position which may be termed the normal position to which they will be actuated when the character of the bar 10 is entirely uniform and free from flaws or defects.

In the event that a slight flaw is present under one of the instruments 35, for example, the leakage flux which will be applied to the vanes 37 and 39 of this instrument will be greater than that which is applied to the corresponding vanes of the instrument 36. If this difference in flux density is sufficiently great, the contact member 44 will be moved relative to one of the arms of the contact member 45 so that it will engage it, thereby connecting the indicating lamps 48 and 49 in series circuit relation to the energized conductors 50 and 51. If the flaw is relatively small, the continued movement of the bar 10 will cause it to pass from underneath the instrument 35 and to increase the density of the leakage flux that is applied to the vanes of the instrument 36. The contact member 45 will then be moved relative to the contact member 44 and the indicating lights 48 and 49 will again be energized. An operator observing the two successive illuminations of the indicating lamps 48 and 49 will then be immediately aware that a slight flaw is present in the bar 10 and he may then stop the motor 15 to further investigate. It will also be observed that the operator will be generally informed as to the particular part of the circumference of the bar 10 at which the flaw is present by observing which set of the indicating lights 48 and 49 has been energized.

In the event that a relatively large flaw or void is present in the bar 10, a relatively great change will occur in the density of the leakage flux surrounding it and this change will be reflected in a marked deflection of the instruments 35 and 36. If it is assumed that the large flaw or void is first moved into proximity with the instrument 35 and a flux of relatively large density is applied to the vanes 37 and 39 of this instrument, the contact member 44 will be moved into engagement with the contact member 45. However, due to the extremely high density to which the instrument 35 is subjected, sufficient torque will be applied to move the contact member 45 into engagement with the fixed contact member 46. It will then be observed that each of the indicating lamps 48 and 49 will be connected directly across the energized conductors 50 and 51, and as a result they will be brilliantly illuminated. The operator will then be informed that a relatively large flaw or void is present in the bar 10 and by observing the particular set of lamps that are brilliantly illuminated, he may determine the particular part of the bar 10 in which the flaw is present.

In the event that a relatively long pipe of gradually increasing size is present in the bar 10 being tested, it will be apparent that there will be slight, if any, difference in the density of the leakage flux as applied to the instruments 35 and 36. For this reason, the contact member 44 may not move relative to the contact member 45 sufficiently far to indicate to the operator that a flaw is present. However, if the pipe is sufficiently large to materially alter the density of the leakage flux, the contact member 45 will engage the stationary contact member 46. The operator, noting that the lamps 48 and 49 have been illuminated to the maximum brilliancy, will then be aware of the type of flaw which may be present under the instruments 35 and 36.

In order to obtain satisfactory operation of the testing apparatus described hereinbefore, it is desirable to adjust the amount of flux generated by the magnetizing winding 22, so that the best operating conditions may be obtained. It is also desirable to provide a suitable tension in the springs 44a, that are used to bias the movable vanes 39 to the normal positions, so that the apparatus will not be too sensitive. However, after the necessary preliminary adjustments have been made, a succession of the bars 10 may be moved through the armature 11. The testing of the bars may thus assume the form of a continuous operation by means of which imperfect material may be immediately discarded while the material of proper quality may be rapidly passed along in the process of manufacture.

Since certain further changes may be made in above construction and different embodiments of the invention may be made without departing from the scope thereof, it is intended that all matter contained in the above description or shown in the accompanying drawings shall be interpreted as illustrative and not in a limiting sense.

I claim as my invention:

1. In apparatus for testing the condition of magnetic material, in combination, means for magnetizing the material to be tested, means responsive to variations in leakage flux disposed at spaced positions along said material, and differential means mechanically operated by said flux responsive means for indicating a difference in the leakage flux density between said spaced positions.

2. In apparatus for detecting flaws or the like in magnetic material, in combination, means for magnetizing the material to be tested, means responsive to variations in leakage flux disposed at spaced positions along said material, means mechanically operated by said flux responsive means for indicating the leakage flux density at said spaced positions, and means for automatically comparing the indications of leakage flux density.

3. In apparatus for detecting flaws or the like in magnetic material, in combination, magnetizing means disposed to produce leakage flux along the material to be tested, magnetic means operable in accordance with variations in the density of the leakage flux and disposed at spaced positions along said material, means movable in accordance with the operation of said magnetic means for indicating a difference in the leakage flux density between said spaced positions, and additional means for indicating the leakage flux density at one of said points when it exceeds a predetermined value.

4. In apparatus for detecting flaws or the like in magnetic material, in combination, magnetizing means disposed to produce leakage flux along the material to be tested, a plurality of individually responsive flux density measuring means disposed at spaced positions along said material, and differential indicating means mechanically operated by said measuring means in accordance with the difference in the flux densities between said positions to reveal the presence of a non-homogeneous portion of said material at one of said positions.

5. In apparatus for detecting flaws or the like in magnetic material, in combination, circuit means for applying a magnetomotive force to said material to produce leakage flux therealong, a plurality of independently operable flux density measuring means disposed at spaced positions along said material, indicating means controlled by said measuring means in accordance with the difference in the flux densities between said positions to reveal the presence of a non-homogeneous portion of said material at one of said positions, and additional indicating means controlled by said measuring means and operative on the application of leakage flux of relatively high density at one of said positions to reveal the presence of a relatively large non-homogeneous portion of said material.

6. Apparatus for detecting non-homogeneous portions of magnetic material in the form of bars or the like comprising, in combination, an armature of substantially U shape having transverse aligned openings in the ends thereof through which a bar to be tested may be passed, a winding connected to a source of electrical energy for energizing the armature to generate magnetic flux within and along the bar as it is moved, and a plurality of flux measuring devices disposed around said bar and within the armature for obtaining indication of the density of the leakage flux along the bar, thereby indicating the relative homogeneity of the bar as it is moved through the armature.

7. Apparatus for detecting non-homogeneous portions of magnetic material in the form of bars or the like comprising, in combination, an armature of substantially U shape having transverse aligned openings in the ends thereof through which a bar to be tested may be passed, a winding connected to a source of electrical energy for energizing the armature to generate magnetic flux within and along the bar as it is moved, a plurality of flux measuring devices disposed around said bar and within the armature, and signalling means individual to each of said flux measuring devices and adapted to be energized thereby when the leakage flux exceeds a predetermined density thereby indicating the relative homogeneity of the bar as it is moved through said field.

8. Apparatus for detecting non-homogeneous portions of magnetic material in the form of bars or the like comprising, in combination, an armature of substantially U shape having transverse aligned opening in the ends thereof through which a bar to be tested may be passed, a winding connected to a source of electrical energy for energizing the armature to generate magnetic flux within and along the bar as it is moved, and a plurality of flux measuring devices disposed around said bar and within the armature, each of said flux measuring devices comprising a pair of instruments of the repulsion vane type disposed in tandem longitudinally along the bar, a fixed and a movable vane in each of said instruments, contact members carried by the movable vanes and disposed to come into contact engagement on the occurrence of a predetermined difference in the flux densities measured by each instrument regardless of which instrument is subjected to the greater flux, and signalling means connected to a current source and to said contact members for indicating when said contact members are closed.

9. Magnetic flux density measuring means comprising, in combination, a pair of instruments of the repulsion vane type adapted to be mounted in spaced relation in the magnetic field to be measured, and indicating means operated in accordance with the movement of the vanes in the instruments and disposed differentially to permit a comparison of the flux densities measured by each instrument.

10. Magnetic flux density measuring means comprising, in combination, a pair of instruments of the repulsion vane type adapted to be mounted in spaced relation in the magnetic field to be measured, a fixed and a movable vane in each instrument, contact members carried by the movable vanes and disposed to come into contact engagement on the occurrence of a predetermined difference in the flux densities measured by each instrument, signalling means connected to said contact members, and circuit means connected to a current source for energizing the signalling means when said contact members are closed.

11. Magnetic flux density measuring means comprising, in combination, a pair of instruments of the repulsion vane type adapted to be mounted in spaced relation in the magnetic field to be measured, a fixed and a movable vane in each instrument, contact members carried by the movable vanes and disposed to come into contact engagement on the occurrence of a predetermined difference in the flux densities measured by each instrument, a stationary contact member mounted in the path of the movable contact members and disposed to be engaged thereby on the occurrence of a relatively high flux density measured by said instruments, signalling means connected to a current source and to said movable contact members for indicating the existence of said predetermined difference in the flux density as measured by each instrument, and circuit means connecting the current source to the stationary contact member to effect a different operation of the signalling means to indicate the existence of said relatively high flux density.

12. Magnetic flux density measuring means comprising, in combination, a pair of instruments of the repulsion vane type adapted to be mounted in spaced relation in the magnetic field to be measured, a fixed and a movable vane in each instrument, interfitting contact members carried by the movable vanes and disposed to come into contact engagement on the occurrence of a predetermined difference in the flux densities measured by each instrument regardless of which instrument is subjected to the greater flux density, and signalling means connected to a current source and to said contact members for indicating when said contact members are closed.

13. Magnetic flux density measuring means comprising, in combination, a pair of instruments of the repulsion vane type adapted to be mounted in spaced relation in the magnetic field to be measured, a fixed and a movable vane in each instrument, interfitting contact members carried by the movable vanes and disposed to come into contact engagement on the occurrence of a predetermined difference in the flux densities measured by each instrument regardless of which instrument is subjected to the greater flux density, a stationary contact member mounted in the path of the movable contact members and disposed to be engaged thereby on the occurrence of a relatively high flux density measured by said instruments, signalling means connected to a current source and to said movable contact members for indicating the existence of said predetermined difference in the flux density as measured by each instrument, and circuit means connecting the current source to the stationary contact member to effect a different operation of the signalling means to indicate the existence of said relatively high flux density.

14. In apparatus for detecting non-homogeneous portions of magnetic material in the form of bars or the like, in combination, electro-magnetic means for generating a magnetic field within and along a bar to be tested, a main frame disposed in the magnetic field around the bar, a plurality of flux measuring devices spaced around the bar to obtain indications of the density of the leakage flux along the bar, an articulated frame for supporting each flux measuring device mounted on the main frame, resilient means operatively connected to each articulated frame for biasing the flux measuring devices radially inwardly to maintain them in substantially constant spaced relation relative to bars of varying size, and adjustable stop means mounted on each articulated frame for preventing the inward movement of the flux measuring device individual thereto beyond a predetermined range of movement.

15. Apparatus for detecting non-homogeneous portions of magnetic material in the form of bars or the like comprising, in combination, an armature of substantially U shape having transverse aligned openings in the ends thereof through which a bar to be tested may be passed, adjustable means for centering the bar in said openings, a removable collar member of magnetic material disposed in each opening to accommodate bars of different size thereby reducing the reluctance of the magnetic circuit at said openings to a minimum for each size, a winding connected to a source of electrical energy for energizing the armature to generate magnetic flux within and along the bar as it is moved, and a plurality of flux measuring devices disposed around said bar and within the armature for obtaining indications of the density of the leakage flux along the bar thereby indicating the relative homogeneity of the bar as it is moved through the armature.

16. Apparatus for testing the condition of a specimen of magnetic material comprising, in combination, means for magnetizing the specimen to be tested, and a plurality of flux density measuring means disposed at different positions adjacent to said specimen within the field generated by said magnetizing means, each of said measuring means comprising a pair of differentially related spaced flux measuring pointers disposed to indicate any difference in the flux densities at said devices.

THOMAS R. WATTS.